United States Patent [19]
Casadevall et al.

[11] 3,773,593
[45] Nov. 20, 1973

[54] METHOD OF MAKING HOT GAS MANIFOLD

[75] Inventors: James L. Casadevall; James P. Arnold; Rudy D. Buzlea, all of Orlando, Fla.

[73] Assignee: Martin Marietta Corporation, New York, N.Y.

[22] Filed: Mar. 25, 1971

[21] Appl. No.: 128,110

Related U.S. Application Data
[63] Continuation-in-part of Ser. No. 764,506, Oct. 2, 1968, abandoned.

[52] U.S. Cl............ 156/294, 138/144, 156/190, 156/191, 156/285, 156/286, 156/287, 181/40
[51] Int. Cl............................................ F01n 7/16
[58] Field of Search............ 156/190, 191, 195, 156/285, 286, 287, 293, 294; 138/39, 144; 181/40; 264/90, 101

[56] References Cited
UNITED STATES PATENTS

| | | | |
|---|---|---|---|
| 3,711,361 | 1/1973 | Casadevell | 156/191 |
| 3,641,870 | 2/1972 | Eig | 156/195 |
| 3,573,123 | 3/1971 | Siegel et al. | 156/190 |
| 2,417,881 | 3/1947 | Munger | 156/286 |
| 3,135,297 | 6/1964 | Nordberg et al. | 138/144 |
| 2,789,934 | 4/1957 | Busbach | 156/287 |
| 2,312,993 | 3/1943 | Stephens | 156/286 |
| 3,043,094 | 7/1962 | Nichols | 181/40 X |
| 3,414,460 | 12/1968 | Hassert et al. | 138/144 X |
| 3,488,723 | 1/1970 | Veazie | 181/40 |
| 3,425,885 | 2/1969 | Webb | 264/90 |

Primary Examiner—Alfred L. Leavitt
Assistant Examiner—Caleb Weston
Attorney—Julian C. Renfro et al.

[57] ABSTRACT

A lined manifold for carrying high temperature, high pressure gases for prolonged periods of time, with the liner portion of the manifold being prepared out of suitably reinforced thermosetting resin material or the like, that has been formed into a diameter in keeping with the inner diameter of the manifold, and brought to the partiallly cured condition. Thereafter, upon insertion into the metal portion of the manifold, the liner portion is usually caused to expand into firm contact therewith, and is then brought to the cure temperature so that the liner portion can be converted to the fully cured condition, and thus become an integral part of the manifold. We prefer to use preimpregnated bias cut tape made of high temperature materials in manufacturing the liners, for it is easier to work with, and less likely to burn and slough off when on the interior of a manifold than in the case of liners made of other types of tape or material. Manifolds made in accordance with this invention can be operated at a lower external temperature than can ordinary, unlined manifolds, and hence mounting and shielding problems are minimized.

44 Claims, 8 Drawing Figures

Patented Nov. 20, 1973

INVENTORS
JAMES L. CASADEVALL
JAMES P. ARNOLD
RUDY D. BUZLEA

BY C. Joseph Huson

ATTORNEY

Patented Nov. 20, 1973
3,773,593
3 Sheets-Sheet 3
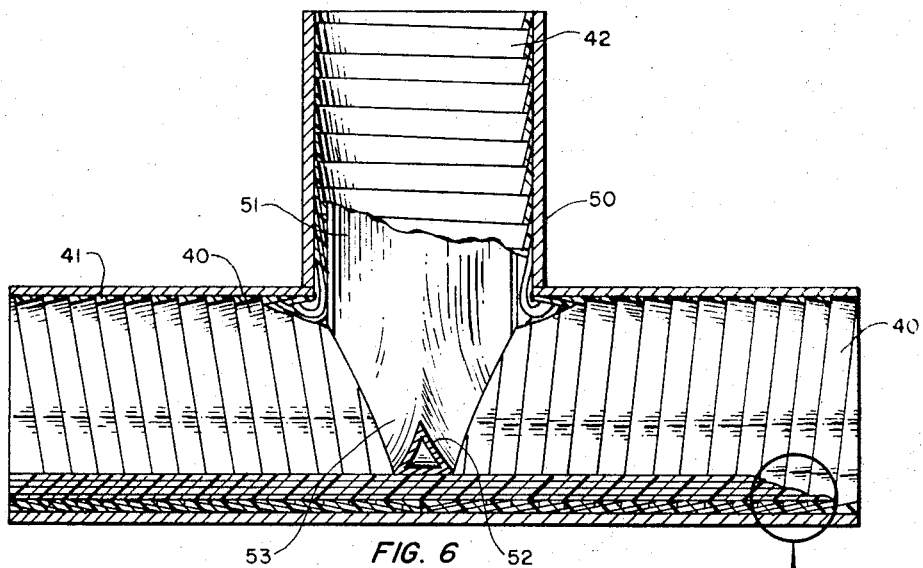
FIG. 6
FIG. 6A
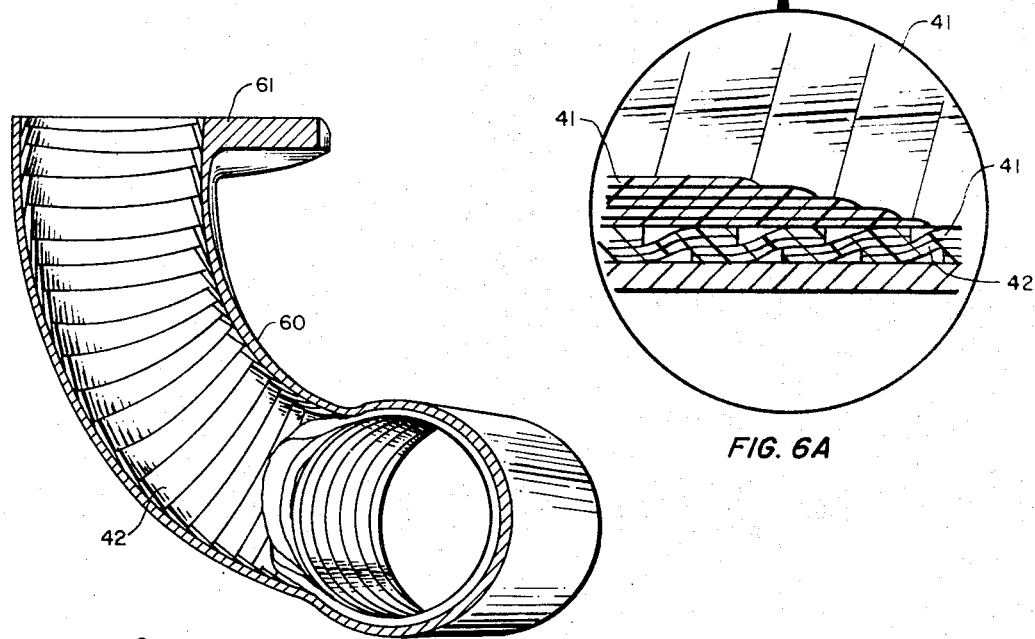
FIG. 7
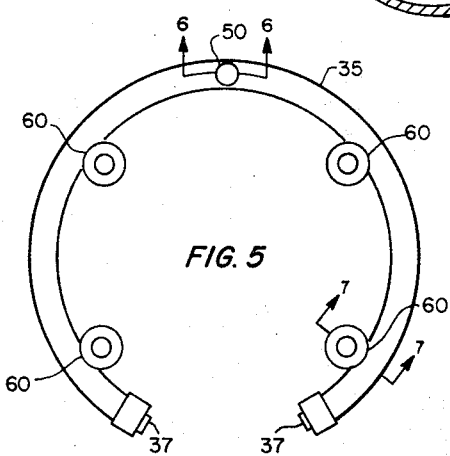
FIG. 5
INVENTORS
JAMES L. CASADEVALL
JAMES P. ARNOLD
RUDY D. BUZLEA
BY C. Joseph Husar
ATTORNEY

METHOD OF MAKING HOT GAS MANIFOLD

REFERENCE TO RELATED INVENTION

The present invention is a continuation-in-part of the application of Casadevall et al entitled "Hot Gas Manifold and Method of Assembly," filed Oct. 2, 1968, Ser. No. 764,506 now abandoned.

BACKGROUND OF THE INVENTION

1. Field of the Invention

This invention relates to manifolds of the type that must conduct fluids of extremely high temperature and pressure, such as may be involved for example in rockets and other missile systems.

2. Description of the Prior Art

In the past, a number of high temperature manifolds have been provided for use in rocket motors, airborne missile systems and the like, but in each known instance it was necessary to adopt extreme and expensive constructional techniques in order to prevent almost immediate burnout of the metals typically used in the manufacture of manifolds.

On the one hand, it was possible to use certain high temperature alloy steels, such as Rene 41, that could withstand the temperature of the hot gases. Such alloy steels are very expensive, however, and are difficult to fabricate and weld. The use of this and other high temperature alloys was fraught with disadvantages in addition to expense and fabrication difficulties, and, for example, these esoteric alloys required the use of flexible fittings at the locations where the manifolds were mounted upon certain supporting components, so that large expansion rates could be accommodated. Also, because such manifolds were unshielded, tremendous quantities of heat were radiated into the components surrounding the manifold, thereby involving the use of shielding materials, and of course the additional weight thereof.

One step taken in an attempt to avoid the use of exotic alloys was the lining of manifolds of less expensive alloys by the use of thermosetting resins poured into the manifold, after which the manifold was rotated and otherwise moved into innumerable different positions in order that the resin could contact all of the inner surfaces of the manifold and thus hopefully coat same. Such would of course cut down on the amount of heat contacting the metal of the manifold and radiating to the components surrounding the manifold, but unfortunately, these practices had been abandoned inasmuch as nonuniform liner thicknesses were obtained. This meant that certain spots were exceedingly thin, causing premature burnout, whereas other portions were very thick, unnecessarily restricting the flow of gas therethrough and adding an undesired weight penalty. Further, these techniques could not enable strengthening materials such as high temperature fibers to be disposed in positions in which extreme temperature and pressure conditions could be expected to be encountered.

SUMMARY OF THIS INVENTION

In accordance with the present invention, we have evolved an inexpensive yet highly satisfactory technique for lining manifolds with high temperature, high performance material such that the exceedingly deleterious effect of high temperature, high pressure gases can be withstood by a manifold of comparatively inexpensive alloy for long periods of time, such being accomplished with a minimum of weight penalty and with a minimum need for the shielding of adjacent components to protect them from the heat radiated from the manifold.

Although we could make the manifold liner in accordance with any of several different techniques, we have evolved utilizing high temperature fibers and thermosetting or elastomeric resins, we have had the most success making the liners from preimpregnated tape of high temperature material, which tape is wrapped for a large number of turns about a mandrel appropriate to the size of the manifold into which the liner is to be inserted, and then partially cured. As will be apparent, the liner must be somewhat smaller than the manifold in order to enable insertion into the manifold, and when in position, it must be firmly bonded to the interior of the manifold. In order that the liner can be caused to firmly contact the inner surface of the manifold, we may utilize an inflatable or expandable means, such as a bladder or the like in order to expand the liner to the desired extent so that it can be fully cured into the proper position. Because some expansion of the liner is necessary during such a procedure, we may make the liner out of say nylon cloth or tape, or other such material that will permit the desired degree of expansion.

However, we prefer the use of bias cut tape of say silica fiber in constructing liners in accordance with this invention, the bias tape being preferred for a multiplicity of reasons. In the first place, bias cut tape is much easier to wrap upon a small diameter mandrel than any other type of tape, for the fibers of such tape can readily shift their weave angle in order to conform to the desired shingle construction.

Secondly, bias cut tape has the characteristic of being able to expand and stretch to a considerable extent, thereby facilitating the problem of expanding the liner made from such tape into firm contact with the inner sidewalls of the manifold. Thirdly, bias cut tape is of optimal thermal construction, for a minimum amount of each fiber is exposed to the hot gases passing through the manifold, which of course minimizes the likelihood of large particles or portions burning and sloughing off the liner, which could of course damage valves and other components of the control system with which the manifold may be used.

Fourthly, bias cut tape amounts to a configuration in which most of the fiber ends can be secured directly to the inner sidewall of the manifold, which of course means that much better adherence of the liner to the manifold can be obtained, thus assuring that large portions of the tape or liner do not pull away from the manifold.

It is therefore a primary object of this invention to provide a novel lined manifold, and to the method for making and installing same.

It is another important object of our invention to make a relatively inexpensive yet highly durable manifold, while eliminating the need for using expensive refractory materials.

It is another object of this invention to provide a manifold with a lining of high temperature material such that our novel manifold can carry high pressure gases for prolonged periods of time, even though the gases are at a temperature higher than the point at which the metal of the manifold would melt.

It is yet another object of this invention to provide a novel lining of substantially uniform thickness that can be placed inside a manifold of ordinary metal, thus greatly extending the life of the manifold and quite advantageously enabling the manifold exterior to remain relatively cool, which in turn minimizes the need for the shielding of components disposed in the vicinity of the manifold.

It is still another object of this invention to provide an inexpensive manifold whose external metallic portions operate at a comparatively low temperature, making unnecessary the use of expensive, flexible fittings of the type necessitated when manifolds having high expansion rates are to be secured to surrounding stationary components.

It is still another object of our invention to provide a liner of thermosetting materials made apart from the manifold to receive it, with the liner being in partially cured condition and capable of expansion into firm contact with the interior sidewalls of the liner when inserted into the manifold, with a subsequent curing procedure making the liner an integral part of the manifold.

It is another object of our invention to provide a highly satisfactory arrangement for disposing a high temperature lining in a manifold, with the lining being of consistent thickness to not only insure against burnout, but also to insure against excess weight.

It is another object of our invention to provide a high temperature liner for a manifold such that during use it is assured that no large particles will burn or slough off from the liner, which could tend to clog or damage certain components of an associated control system.

It is another object of our invention to provide a high temperature liner made of bias cut tape, such that most if not all of the fibers of the tape are in contact with the metal of the manifold, thus to form a firm anchor for same.

It is another object of our invention to construct a manifold of bias cut tape such that the liner can be constructed apart from the manifold, and after partial curing, inserted into the manifold and expanded outwardly into firm contact with the inner sidewalls of the manifold without damage to the fibers, which fibers, because of the bias cut, are free to shift in their weave pattern, with the resin of the liner thereafter being heated to effect a full cure while firmly attaching to the interior of the manifold.

These and other objects, features and advantages will be more apparent from a study of the appended drawings in which:

FIG. 5 is a plan view of the manifold to a small scale, thus to reveal the relative positions of typical inlet and outlet connections;

FIG. 6 is an enlarged sectional view of the manifold at the inlet location, this view revealing the details associated with the preparation of this portion of the manifold to handle the highly erosive hot gases entering the manifold;

FIG. 6A is a greatly enlarged view, this revealing additional details associated with the construction of the manifold at the location adjacent the inlet; and FIG. 7 is an enlarged sectional view generally corresponding to indicated section lines in FIG. 5, but being rotated somewhat from such position in order to illustrate the manner in which successive layers of the tape overlap.

DETAILED DESCRIPTION

Figure 1:
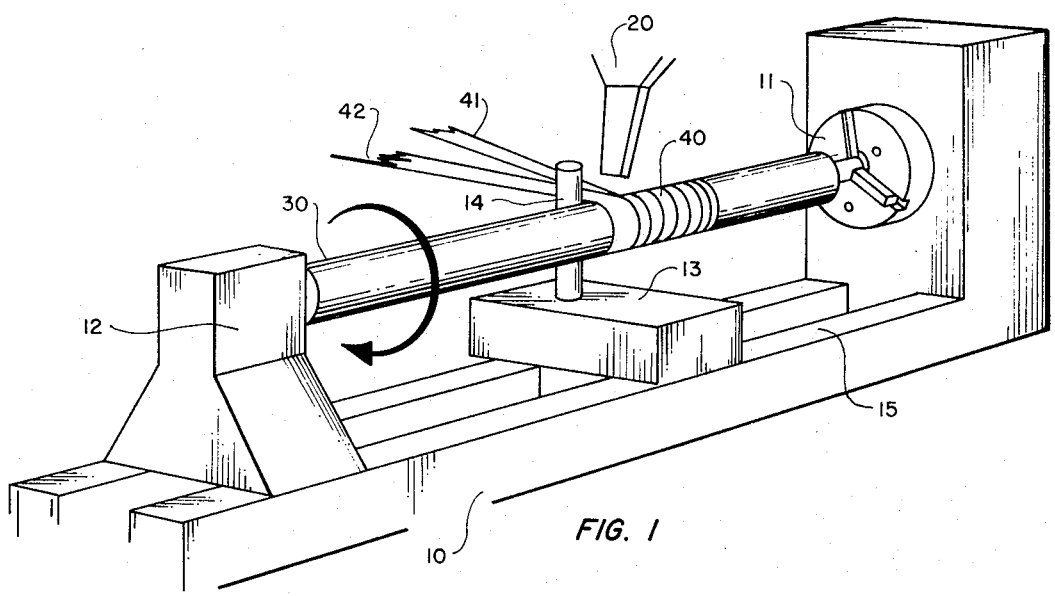
FIG. 1 is a view illustrating a typical procedure for preparing a liner by wrapping a number of turns of tape about a mandrel disposed in a lathe.

Turning now to FIG. 1, it will be seen that we have there shown a typical setup by which liner elements 40 are made up in accordance with this invention. In this figure a lathe 10 is shown in which a mandrel 30 such as of steel is utilized, upon which mandrel has been deposited a parting agent, such as teflon film. One end of the mandrel 30 is supported by chuck 11, and the other end is supported by a rotatable member mounted in centering end or tail stock 12 of the lathe. The chuck is driven in rotation so as to cause the mandrel to turn in the direction indicated by an arrow in this Figure.

A liner element 40 may be formed by wrapping resin impregnated quartz tape 41 and resin impregnated silica tape 42 simultaneously, or can of course be made from a single tape. At the outset, the quartz tape and the silica tape are hand wrapped upon the mandrel, being secured at one end with any appropriate means, such as by conventional missile tape, or other such pressure sensitive adhesive tape. Thereafter, the mandrel can be caused to turn at a desirable rate of speed, such as, for example, at 45 rpm. so rpm, the simultaneous wrapping of the two tapes upon the mandrel can be effectively carried out. If desired, we can use a guidepost 14 that extends upwardly from crossfeed 13 for guiding the tapes 41 and 42 as the winding of a liner element is caused to progress. As is well known, a crossfeed traverses the length of the bed of a lathe during the continued rotation of the chuck, and in FIG. 1 the crossfeed is moving along bed 15 from right to left as the liner is built up in length. The mandrel for example can be 5 feet long, and 1.250 inches in diameter, which is suitable for the manufacture of liners 56 inches long, which are to be inserted in manifolds of a certain type, discussed hereinafter.

It is important to emphasize that it is not required that two tapes be utilized in the construction of a liner in accordance with this invention. In one particular instance, we utilized the two tapes, one of quartz and the other of silica, for only the first 9 inches of the liner, and thereafter utilized only silica tape. Although this two tape construction will be discussed at greater length hereinafter, it should be pointed out at this juncture that silica tape is principally used in most instances in constructing liners because it is much less expensive than quartz tape. The quartz tape is, however, utilized at critical locations because of the higher strength of its fibers and its greater erosion resistance.

As is known, quartz tape is made of fibers that have been individually created by causing molten quartz to be drawn or extruded through a small orifice. Consequently, these fibers have great strength without being brittle, and when a cloth or tape of these fibers is impregnated with a standard, hard-char-forming phenolic resin, an extremely durable product is created.

Silica tape on the other hand is made of leached fibers, that on an individual basis do not have the great strength of the quartz fibers. Silica tape is typically impregnated with a rubber modified phenolic resin, thus allowing a liner made principally of such tape to expand and/or reshape with changes in the manifold into which it was inserted. Additionally, this type of phenolic resin becomes highly adhesive at cure temperatures, so that it will firmly adhere to the inner surface of such a manifold, and be incorporated and remain a permanent part thereof. We are not to be limited to any particular resin, however, for we can use tapes preimpregnated with elastomeric or thermosetting resins, or an appropriate blend of these.

Inasmuch as a liner made in accordance with this invention is to be caused to expand to some extent subsequent to its insertion in a manifold, the tape from which a liner is made is typically bias cut so as not to have continuous longitudinal fibers that would serve to inhibit expansion and contraction of the tape as may be required during the insertion of the liner into the manifold and the subsequent expansion of the liner into firm contact with the inner sidewalls of the manifold. The fabric of the silica tape we use makes up approximately 70 percent of the tape by weight, with the rubber modified phenolic resin with which the tape is impregnated making up the balance of 30 percent. We prefer to use NARMCO 4085 tape, made by the Narmco Materials Division, 600 Victoria Street, Costa Mesa, California, and for example it can be 3/4 inch wide and .020 inch thick.

The tape is wrapped in the general manner shown in the drawings, so that each turn is at a consistent shingle angle or overlap with respect to preceding and succeeding turns, although in some locations, it may be desirable to space the turns closer together. In constructing liners, the tape must be wound on the mandrel in the proper direction with respect to the intended flow of gas through the manifold with which the liner will be used. This is to say, the layers or plies of tape must be in such a relationship to the flow of gases, that the gases will tend to force each ply into intimate contact with the adjacent ply, rather than trying to lift each ply.

It may be appropriate to apply heat during the time that a liner is being created, and to that end we provide a heat gun 20 as shown in FIG. 1, that is positioned in the immediate vicinity of the tapes 41 and 42 as they are brought into contact with the mandrel. This gun can be arranged to direct a flow of hot air upon the tapes, thus to cause the resin of the tapes to become slightly tacky and desirably cause the evenly disposed turns of the tape to adhere to each other.

Figure 2:
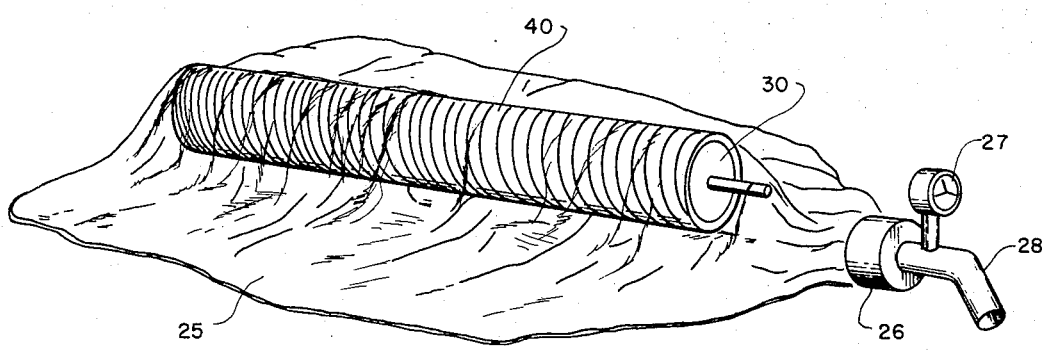
FIG. 2 illustrates a liner disposed on a mandrel, with these items being in a wrapper to enable a vacuum to be drawn, which arrangement enables atmospheric pressure to compact the liner elements.

After the wrapping operation has been carried to a sufficient extent to create a liner of the desired length, the mandrel is removed from the lathe and with the liner disposed thereon, placed in a vacuum bag 25, in the manner shown in FIG. 2. The bag can be of polyethylene, nylon or other suitable film material, with a suction being used so as to remove air to a desirable extent. That this may be accomplished, one end of bag 25 is provided with a cap 26 that in turn is connected to a vacuum line 28. A vacuum gauge 27 is positioned in line 28 in order to give a readout as to the amount of vacuum being pulled. At sea level conditions, we prefer to pull a minimum of 27 inches of mercury, which is sufficient in order that atmospheric pressure can act upon and suitably compact the layers of tape.

The bagged mandrel and liner is then placed in a preheated oven at approximately 180° F, and maintained in the oven for a period of approximately 5 minutes after reaching temperature. After being heated for this length of time, the liner is in the desired partially cured or B stage condition, which is an intermediate stage in the reaction of a thermosetting resin in which the material softens when heated and swells in contact with certain liquids, but does not entirely fuse or dissolve. The mandrel and liner are then removed from the oven, with the vacuum still being maintained, at least until the temperature of the liner has reduced to not more than say 125° F.

After the mandrel has cooled to a desired temperature, it is then to be removed from the bag 25 so that further configuring of the liner as may be necessary can be accomplished. For example, it may be desired to place the mandrel 30 in a lathe so that the liner can be brought to a desired thickness, and have a desirable outer surface configuration. In one particular utilization, we needed a pair of liners 56 inches long, each having a wall thickness of .070 in., and the use of a lathe makes it possible to achieve the desired wall thickness in a very satisfactory manner. However, it is to be understood that wall thickness may vary from liner to liner, or even vary in a given liner in accordance with the intended use. In the instance involving the manifold illustrated in FIGS. 3 and 5, it has an inside diameter of 1.527 inches and an outside diameter of 1.625 inches. Preparing a liner on a mandrel 1.250 inches in diameter so that the liner will have a wall thickness of .070 inch means that the overall liner diameter is approximately 1.390 inches, which is sufficiently smaller than the inside diameter of the manifold that the liner can be easily inserted into the manifold after it has of course been brought to size and removed from the mandrel.

If the liner technique described herein is to be used in conjunction with a manifold of substantial length or size, or of unusual configuration, it may be desirable to utilize more than one liner section. Note in FIGS. 3 and 5 that the manifold 35 is of substantial diameter, and of a configuration such that it forms almost a complete circle. Accordingly, for liner insertion reasons and length reasons, we prefer to make two separate liner sections, with this figure revealing that one section has already been moved into the desired location in the manifold, and with the other section being shown in the process of being inserted. Although the use of gloves by the workmen inserting a liner is not necessarily a requirement from the temperature standpoint, it is usually a requirement from the standpoint of cleanliness in that oils from the skin or other contaminants can have a deleterious effect upon the curing of the resin and upon the adherence of the liner to the inner sidewalls of the manifold 35.

Figure 3:
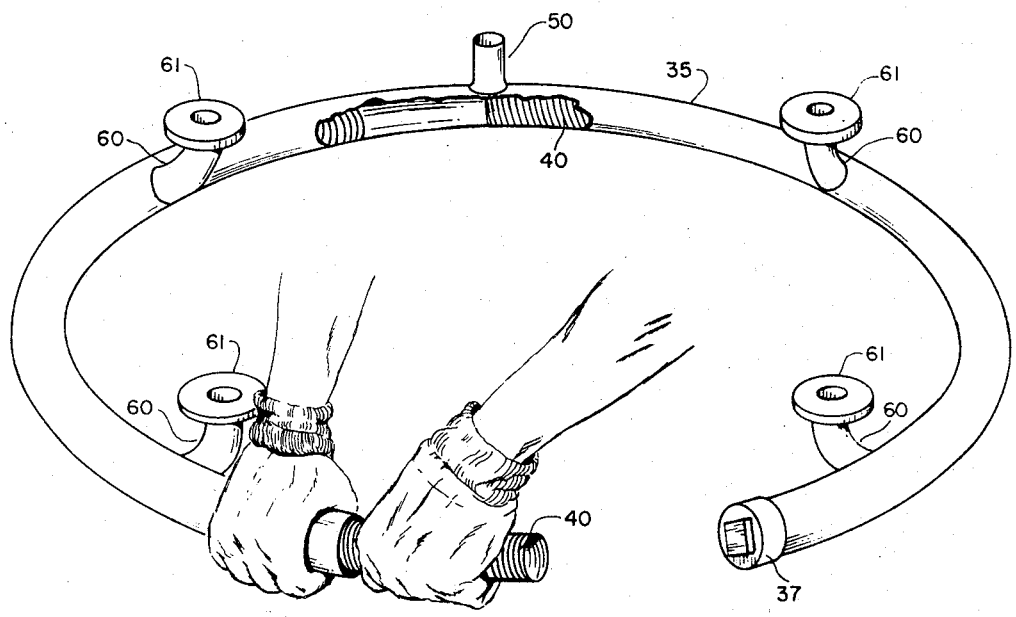
FIG. 3 is a perspective view illustrating the manner in which a liner in accordance with this invention is inserted into a typical manifold, with portions of the manifold being broken away to reveal that a similar liner portion had previously been inserted into an adjacent part of the manifold.

In the manifold shown in FIG. 3, one inlet 50 is utilized, and several outlets 60. Because as revealed in FIGS. 3 and 5, the inlet 50 is disposed approximately half way around the manifold from the liner insertion locations, the use of quartz tape for the first 9 inches of each liner, as previously mentioned, causes these particularly durable liner locations to occur adjacent the inlet for the hot gases. As will be understood, the direction or lay of the tapes used in the two liner sections will be different, for the hot gases entering the inlet 50 flow to the left and to the right as depicted in FIG. 3, and the wrap directions of the liner sections must of course be compatible with the flow direction of the gases.

Quite obviously it would be difficult if not impossible to cause a liner inserted in the manner shown in FIG. 3 to extend directly into the inlet or into the outlet ports on a continuous basis, so accordingly we create a number of short liner elements that are individually inserted into the ports 50 and 60, with such insertion and subsequent curing usually being accomplished before the principal liner sections are inserted. The short liner sections can be provided by constructing another long liner in the manner just described in conjunction with FIG. 1, with such liner then being cut at several locations in order to create short liner sections of proper length.

Because the gases entering the inlet 50 may be particularly erosive, and at a temperature in excess of 2,000° F, we may prefer to make the liner section inserted into the inlet of greater wall thickness, such as .125 inch thick. FIGS. 6 and 6A reveal the constructional details associated with the inlet area, which will be discussed hereinafter.

It should be noted that we can either proceed to insert a liner into a manifold shortly after any necessary sizing operations, or alternatively, we can store the liner for periods up to several months before using. As will be apparent to those skilled in the art, the resin of a liner is in the so-called B stage subsequent to heating in an oven in the manner specified above, in which condition it can remain for certain comparatively short periods of time at room temperature. Storage for long periods of time, however, can only be accomplished if storage is at sufficiently low temperatures that normal hardening tendencies are inhibited. Accordingly, we prefer to store completed or substantially completed manifold liners at a temperature of 32° or lower.

It should be noted with regard to the hardening of the liner that it could be maintained for a very few days at room temperature without damage, although we do not prefer for it to be exposed to ambient temperature for longer than 48 hours. Accordingly, if storage is in order, well within the 48 hour time frame we place the liner in a protective covering in a freezer so that the temperature of the resin may be brought to a sufficiently low number of degrees for effective storage. If the liner were left at room temperature for say 30 days, it would almost certainly no longer be of value for the intended purpose inasmuch as the constituent resin would have advanced so far in the state of cure as to become brittle, unworkable, and would then develop little if any adhesion to the manifold during the attempted curing cycle.

Turning now to the steps involved in the method of securing the partially cured liner elements or sections to the interior of a manifold, the first step is to heat the individual pieces of wrapped liner to make them slightly more flexible. After heating, the sections can be inserted into a manifold jig, at which time the inlet and outlet apertures are bored.

For the particular manifold at hand, we prefer to bore the hole at the inlet location full size, for it is to receive an insert 51 that extends from the inlet pipe 50, well into the main liner portions. Because this insert goes beyond the juncture between the metal and liner portions of the manifold 35, the entering hot gases cannot come in direct contact with the metal of the manifold; see FIG. 6.

With regard to the boring of holes in the main liner portions at locations corresponding to the outlets shown in FIGS. 3 and 7, such holes are bored considerably undersize, so that "flaps" will be formed from the surrounding portions of the main liner sections upon the pressurization of the main bladder used during curing, which flaps extend out into the outlets, so as to prevent penetration of the hot gases under the liners of the outlet ports, where the gases could attack the bare metal.

As a further point, inserting the partially cured liner sections into the manifold jig serves to give such sections a proper curvature or configuration. Then, after the boring of the apertures, the liners are removed from the jig and the process of bonding the liner to the manifold can begin.

The first step in the bonding operation, and before the insertion of the principal liner sections, is to insert the four outlet liners in place in the individual ports 60, which liners are partially cured. When inserting the outlet liners in the respective ports, care must be exercised to insure that the shingle angle of the liner is proper. The shingle angle must of course be in the direction of flow of the gases to prevent the high velocity gases from getting under the liner and ripping the liner from within the manifold. In other words, the edges of the various turns of the tape must be in a direction away from the direction in which the flow is coming. Next, a finger-like silicone bladder is inserted inside the length of each port, extending slightly into the main tube portion. The portion of each bladder extending above the port is provided with a pressure connection. Approximately 30 lbs. of air pressure is pumped into each bladder and then the manifold with the liners held in place by the bladders is placed into an oven to cure. The manifold is kept in the oven for a period of one hour and the oven is maintained at 325° F. After curing is completed, with the 30 lbs. of air pressure being maintained in the bladders, the manifold is removed from the oven and permitted to cool.

Turning back to FIG. 3, there is shown a typical manner in which the principal liner elements 40 are inserted into the manifold. Again, care must be exercised to insure that the shingle angle is proper. In this figure, a portion of the manifold 35 has been broken away to illustrate the position of the liner elements, and the right hand liner element 40 is revealed to have already been positioned in place. As a further precaution, care must be taken to insure that each liner element 40 is properly inserted into the manifold 35 to permit the inlet and outlet cut outs of the liner to properly position themselves with respect to the respective ports of the manifold.

Figure 4:
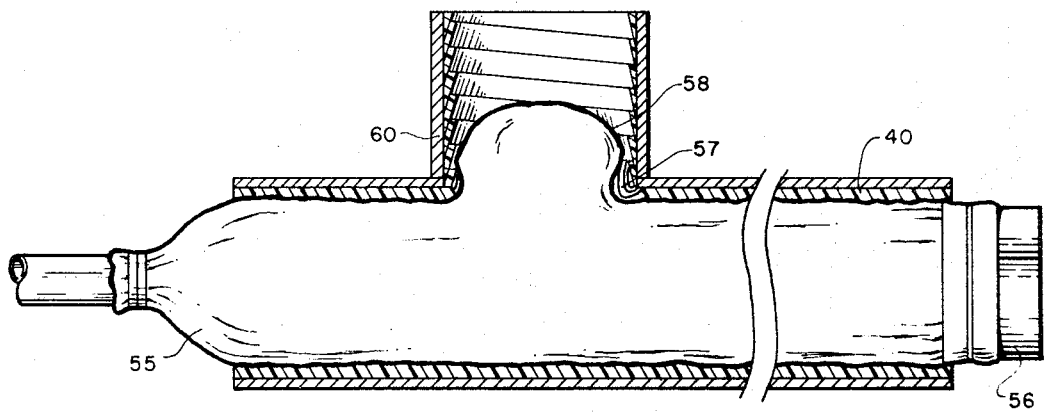
FIG. 4 is a sectional view to a larger scale of a portion of a manifold adjacent one of the outlet portions, with a bladder being utilized in the manifold to hold the liner into the correct location for curing.

After the second principal liner portion has been inserted into the mainfold, then the bonding procedure involving the liner elements being secured into position is ready to begin. FIG. 4 illustrates the manner in which the main bladder 55 is inserted into the inside diameter of the liner elements 40. The remote end of the bladder 55 is plugged, as shown at 56, while the other end is provided with an appropriate pressure connection (not shown), to retain the air pressure within the bladder. As the air pressure is applied to the bladder 55, the bladder becomes distended as indicated by the bulge 58 at the location of port 60. With the bladder 55 projecting up into the outlet 60, the portion of the principal liner section 40 disposed at the outlet is caused to be turned upward as shown at 57, to overlap the liner portion which is already secured in the outlet 60, and thus to prevent the entry of hot gases between the liner and the metal portion of the manifold. Although only one outlet port 60 is shown in FIG. 4 for reasons of simplicity, it is to be understood that four or so ports may be utilized. Although not shown, plugs are inserted into the upper end of each outlet 60 and both of the ends of the manifold to limit the amount of expansion of the bladder 55 up into the port 60 and at its ends when pressure is applied. When all liner components are in place and the bladder or bladders 55 have been inflated to force all portions of the liners in firm contact with the interior of the metal manifold member, the manifold 35 is placed in an oven to cure for a period of 1 hour at 325° F. After the curing is completed, the air pressure is continued on the bladder 55 while the manifold is cooling. As shown in FIG. 7, the liner 40 of mainfold 35 overlaps the comparatively short outlet liners to provide a smooth flow path for the hot gases flowing therethrough, and preventing any possibility of gas penetration into the joints.

After the principal liner members are thus secured in position, the liner element for the inlet port 50 is inserted in the appropriate position, which of course means that "flaps" formed from peripheral portions of the inlet liner extend into the main liner, as revealed in FIG. 6. The silicone bladder is inserted into the inlet port 50 down to the bottom of the main liner tube beyond the port, so that the flaps from the inlet liner can be forced against the interior of the main liner portions. After air pressure has been applied to the bladder, the manifold 35 is again placed in an oven at 325° F for a period of 1 hour, to allow the inlet liner to fully cure. Again, the air pressure is maintained in the bladder while the manifold is cooling.

Turning again to FIG. 6, it will be seen that this figure reveals a sectional view of the manifold inlet 50 taken along the line 6—6 of FIG. 5. After the liner halves or sections 40 are secured in position and the liner for the inlet port 50 is in place, additional layers of quartz tape may be inserted in the liner elements 40 in the immediate vicinity of the inlet port 50.

FIG. 6A is an enlarged detail sectional view illustrating certain subject matter of FIG. 6. In FIG. 6A is revealed manifold portion 35 with a wrap of silica tape 42 immediately next to the internal diameter of the manifold 35. Inwardly of the silica tape 42 is a wrap of quartz tape 41. As pointed out earlier herein, the double layers of silica tape 42 and quartz tape 41 do not continue for the entire length of the liner elements 40, but only extend to the right and left of the centerline of the inlet port 50 for a distance of approximately 9 inches. FIG. 6A also shows the position of five additional layers of quartz tape 41, after the insertion of which, a bladder is again used, and the manifold placed in an oven to cure these additional layers of quartz tape. The reason for the additional strengthening of liner halves 40 in the inlet area is of course necessitated by the fact that this area is subjected to the most extreme conditions that exist anywhere in the manifold 35. Not only is the temperature of the gases highest in this area, and the velocity of the gases at their maximum as the gases enter the manifold, but also the hot gases will most likely contain many unburned particles of combustion from the gas generator. Further, the gases at this point must make a 90° turn from their direction of entrance, which is likely to cause turbulence to exist in this area.

In order to minimize the amount of turbulence which will be created in the inlet area, a sleeve insert 51 may be positioned into inlet 50. Insert 51 is urged downwardly into inlet port 50 until the base portion of the baffle 52 comes into contact with the layers of quartz tape 41. Thus, the gases entering the inlet port 50 will strike the baffle 52 and will be directed to the right and left thereof with a minimum of turbulence.

Notwithstanding these high temperatures and high velocities, it has been determined that a manifold provided with liner elements which are formed and applied in the manner discribed above can readily withstand these gases without the undesirable stresses set up by thermal expansion as is the case in manifolds which have not been lined in this manner.

By way of a review of the principal method steps involved in forming and applying liner elements to a manifold, the first essential step in the forming of the liner elements is the wrapping of the two main liner elements 40. Each main liner element 40 is wrapped on a steel mandrel that has been covered with a separating agent, and after the proper number of layers have been wrapped, it is placed in a bag and a vacuum drawn. Then the bagged mandrel is placed in a heated oven for a predetermined period of time to allow the tapes to become slightly tacky and adhere to each other. Since the tapes are made of preimpregnated silica and quartz material, when heated in the oven, the tapes become tacky and can more or less adhere to each other, filling the slight crevices which may be present between adjacent layers of the tape, and thus compacting the liner on the mandrel.

After being partially cured to the so-called B stage, the liner elements and their respective mandrels are removed from the oven and maintained in the vacuum bags while they cool down to, say, 125° F. This cooling of the liner element while maintaining it under a vacuum further serves to maintain compaction of the liner element on the mandrel. After the cooling of the liner element is completed, the mandrel and liner are placed in a lathe where the outside diameter of the liner element is turned, such as to a wall thickness of .060 inch.

Since these are the steps required for the wrapping of each liner element, the above process must be repeated for the second liner element. A third element is wrapped in the same manner, but after the above steps have been followed, it is then cut into four liner elements which are latter used to line the four outlet ports of the manifold. Then, another liner element of comparatively short length is wrapped as described above, but it is turned down to a .125 inches wall thickness, so that it can be used to line the hot gas inlet port of the manifold.

The liner elements can now be inserted in a manifold almost immediately, or alternatively, they can be stored in their partially cured state for several months if maintained at a temperature in the vicinity of 32° F.

When the liner elements are to be used, they are inserted into a manifold jig where the necessary apertures are bored therein. Prior to inserting the liner elements into the jig, the individual elements may be heated slightly so as to permit them to become more flexible. With the various elements slightly flexible they can readily conform to the curvature of the manifold and makes for easier insertion into the manifold. It is to be noted that care must be taken when inserting the various liner elements into the jig for the purpose of having apertures bored therein, the reason being that the shingle angle of the individual liner elements must be facing in the proper direction to prevent the gases subsequently flowing therethrough from tearing the liner elements out of the manifold.

After removing the liner elements from the manifold jig, the bonding of liner elements to the inner wall of a manifold is ready to begin. The outlet liners are first positioned in place in their respective outlet ports of the manifold. Next, a silicone bladder is inserted into each of the outlet ports and pressurized. Then the entire manifold is inserted into an oven to cure the outlet liner elements in place, with air pressure being maintained in the bladders during the heating and cooling periods.

Next, the two principal liner elements are inserted into the manifold, with care being taken to insure that the shingle angle of the respective liner elements is directed the proper way, and also that the inlet and outlet ports of the liner elements are in alignment with the apertures in the manifold. Having checked these items, the bladder can be inserted into the main liner elements. The manifold is capped as necessary to hold the bladder in place, this including rod type plugs inserted into the four outlets and the inlet port to limit the amount of expansion of the bladder up into the ports. Air pressure is then applied to the bladder and again the manifold is placed in an oven to complete the cure of these liner elements, after which air pressure is maintained during the cooling of the unit.

The next liner element to be secured in position is the inlet liner. After placing the liner in a position in which it extends down somewhat into the main portion of the manifold, a bladder is inserted into the inlet port extending down to the bottom of the main portion, thus to push portions of the inlet liner into contact with the main liner sections. Air pressure is applied to the bladder, the manifold is cured in an oven for a predetermined cure period, with air pressure being maintained on the bladder during the cooling period.

Having secured all the liner elements in place, five additional layers of quartz tape preferably are placed lengthwise across the base area of the inlet port and the bladder is again inserted. Again, the manifold must be placed in an oven to allow these additional layers to cure in place and the cooling cycle is repeated.

A sleeve insert with its baffle member may now be inserted into the inlet opening. Here, also, care must be exercised to insure that the baffle member is lying transverse to the base of the inlet opening rather than parallel to it. Lastly, the other cap member with its liner element is secured to the manifold, cured in the oven and cooled in the above described manner.

By means of our novel method of wrapping liner elements and subsequently securing them in a hot gas manifold, we have been able to produce a hot gas manifold from readily available, comparatively inexpensive steel, thus making unnecessary the use of exotic, expensive, and hard to fabricate steels. This liner and method of securing it to the manifold have produced a hot gas manifold which is capable of withstanding gases having extreme temperatures and high velocities for long periods of time, with undesirable thermal stresses being essentially eliminated.

The liner frequently has a wall thickness greater than the wall thickness of the outer metal portion of the manifold, and should be of an outside diameter 1/8 inch or so less than the inside diameter of a manifold in the 1 to 2 inch diameter range, to assure reasonably easy insertion procedures.

Without further description, it is thought that the novel features and advantages of this invention will be readily apparent to those skilled in the art to which the invention appertains, and it will, of course, be understood that changes in form, and minor details of construction may be resorted to without departing from the spirit of the invention and scope of the claims.

We claim:

1. A method of extending the useful life of a pipe or manifold through which large quantities of hot fluids are to flow, comprising the steps of constructing an elongated tubular member by wrapping a number of turns of a tape of a fibrous high temperature resistant material impregnated with a thermally curable resin on a support member such that the turns overlap to some extent;

heating to partially cure the resin so as to cause the turns of the tape to adhere together to form a flexible liner;

inserting the liner into a manifold slightly larger than the liner;

causing said liner to expand into firm contact with the inner walls of said manifold, and heating the manifold and liner to such an extent that the resin of the liner becomes fully cured and the liner is bonded to the manifold.

2. The method as defined in claim 1 in which said curable resin is thermosetting.

3. The method as defined in claim 1 in which said curable resin is elastomeric.

4. The method as defined in claim 1 in which said liner is brought to a predetermined wall thickness before it is inserted in the manifold.

5. The method as defined in claim 1, in which the fibers of said high temperature resistant material in said liner are oriented at an acute angle to the axis of said liner.

6. The method as defined in claim 1, wherein said fibrous high temperature resistant material is silica.

7. The method as defined in claim 1, wherein said fibrous high temperature resistant material is quartz.

8. The method as defined in claim 1, wherein said fibrous high temperature resistant material is nylon.

9. The method as defined in claim 1, in which said expanding is using a bladder inserted into said liner.

10. The method as defined in claim 1 including storing said liner after the construction of said liner and prior to the insertion of the liner into the manifold.

11. The method as defined in claim 10, wherein part of said storage is at a temperature low enough to significantly retard the further curing of the resin.

12. The method as defined in claim 1, wherein said high temperature resistant material is a woven material.

13. The method as defined in claim 12, wherein said high temperature resistant material is a bias cut woven tape.

14. The method of extending the useful life of a pipe contacting large quantities of hot fluids, comprising the steps of
constructing a heat resistant elongated tubular member by wrapping on a mandrel a number of turns of a tape of a fibrous high temperature resistant material impregnated with a thermally curable resin such that the turns overlap to some extent;
heating to partially cure the resin so as to cause the turns of the tape to adhere together and form a flexible tubular member;
removing the tubular member from the mandrel;
assembling said tubular member and said conduit;
causing said tubular member to firmly contact the walls of said pipe; and
heating the tubular member and pipe to such an extent that the resin of the tubular member becomes fully cured and the tubular member is bonded to the pipe.

15. The method as defined in claim 14 in which said curable resin is an elastomeric resin.

16. The method as defined in claim 14 in which said curable resin is a thermosetting resin.

17. The method as defined in claim 14, in which said fibrous high temperature resistant material is quartz or silica.

18. The method as defined in claim 14, wherein said fibrous high temperature resistant material is a woven material.

19. The method as defined in claim 14, wherein said high temperature resistant material is a bias cut woven tape.

20. The method as defined in claim 14 including storing said tubular member between the removal of the tubular member from the mandrel and the assembly of the tubular member and the pipe.

21. The method as defined in claim 20, wherein part of said storage is at a temperature low enough to significantly retard the further curing of the resin.

22. A method of rendering a tube highly resistant to a flow therethrough of high pressure, hot fluid by the utilization therein of a high temperature resistant liner, comprising the steps of
wrapping upon a mandrel a number of turns of a tape of a fibrous high temperature resistant material impregnated with a thermally curable resin such that the turns overlap to some extent, thus evolving an elongated member of high temperature resistant material on the mandrel;
in a vacuum, heating to partially cure the resin so as to cause the turns of the tape to adhere together and thus form the elongated member into a liner;
removing the liner from the mandrel;
inserting the liner into the interior of the tube so as to essentially line the tube;
expanding said liner into firm contact with the interior walls of said tube; and
exposing the tube and the liner for a length of time to a temperature sufficient to fully cure the resin of the liner and thus cause the liner to firmly adhere to the interior of the tube.

23. The method as defined in claim 1 in which said curable resin is an elastomeric resin.

24. The method as defined in claim 1 in which said curable resin is a thermosetting resin.

25. The method as defined in claim 22, in which each turn of said tape slightly overlaps each preceding turn of said tape.

22. The method as defined in claim 22 including storing said liner between the removal of the liner from the mandrel and the insertion of the liner into the tube.

27. The method as defined in claim 26, wherein part of said storage is at a temperature low enough to significantly retard the further curing of the resin.

28. The method as defined in claim 22, in which said expanding is by using means inside the liner when in the tube, to expand the liner outwardly into firm contact with the interior of the tube.

29. The method as defined in claim 28 in which said high temperature resistant material is nylon fibers.

30. The method as defined in claim 28, in which said tape is wrapped at a acute angle to the axis of said mandrel.

31. The method as defined in claim 28 in which said material is bias cut tape.

32. The method as defined in claim 31, in which said tape is silica tape or quartz tape.

33. A method of extending the useful life of a manifold through which large quantities of hot gas are to flow, said manifold having at least one inlet port and at least one outlet port, comprising the steps of
wrapping upon a mandrel, numerous turns of a fibrous high temperature resistant tape that have been impregnated with a thermally curable resin such that the turns overlap to some extent;
heating to partially cure the resin, thus causing the turns of tape to bond together and form a somewhat flexible liner;
disposing portions of said liner in said inlet and outlet port as well as along the length of said manifold;
causing said liner to firmly contact the inner walls of said inlet and outlet ports as well as the inner walls along the length of said manifold; and
then exposing the manifold and the various liner portions to a temperature sufficient to fully cure the resin and bond the liner portions into permanent positions in the manifold.

34. The method as defined in claim 33, wherein said walls are firmly contacted by expanding said various liner portions outwardly into firm contact with the inner walls of the manifold and inlet and outlet ports, such that when the resin of the various liner portions reaches the fully cured condition, the liner portions will have become an integral part of the manifold.

35. The method as defined in claim 33 in which two different type tapes are used in constructing a liner, each cut on the bias, with one type tape being impregnated with a rubber modified phenolic resin, and the other impregnated with a hard char forming phenolic resin.

36. The method as defined in claim 33 in which the direction of wrap of the liner portions is such that the hot gas flowing therethrough tends to hold the turns of tape tightly against the interior of the manifold, rather than trying to disrupt the position of the turns.

37. The method as defined in claim 33 including storing said liner between the removal of the liner from the mandrel and the insertion of the liner into the manifold.

38. The method as defined in claim 37, wherein part of said storage is at a temperature low enough to significantly retard the further curing of the resin.

39. The method as defined in claim 33 in which said fibrous high temperature resistant tape is bias cut silica tape.

40. The method as defined in claim 39, wherein said tape is capable of considerable elongation.

41. The method as defined in claim 33 in which said fibrous high temperature resistant tape is bias cut quartz tape.

42. The method as defined in claim 41, wherein said tape is capable of considerable elongation.

43. The method as defined in claim 33 in which said curable resin is a thermosetting resin.

44. The method as defined in claim 43 in which said thermosetting resin is a rubber modified phenolic resin.

* * * * *